United States Patent
Christiansen et al.

(10) Patent No.: US 11,105,314 B2
(45) Date of Patent: Aug. 31, 2021

(54) WIND TURBINE BLADE AND A WIND TURBINE

(71) Applicant: Siemens Gamesa Renewable Energy A/S, Brande (DK)

(72) Inventors: Thomas Lehrmann Christiansen, Aalborg (DK); Donato Girolamo, Molinara (IT)

(73) Assignee: SIEMENS GAMESA RENEWABLE ENERGY A/S

( * ) Notice: Subject to any disclaimer, the term of this patent is extended or adjusted under 35 U.S.C. 154(b) by 73 days.

(21) Appl. No.: 16/506,248

(22) Filed: Jul. 9, 2019

(65) Prior Publication Data
US 2020/0018284 A1  Jan. 16, 2020

(30) Foreign Application Priority Data

Jul. 12, 2018 (EP) .................................. 18183110

(51) Int. Cl.
*F03D 1/06* (2006.01)
*F03D 80/30* (2016.01)

(52) U.S. Cl.
CPC ........... *F03D 1/0675* (2013.01); *F03D 80/30* (2016.05); *F05B 2240/30* (2013.01)

(58) Field of Classification Search
CPC ..... H05F 3/00; H05F 3/02; H05F 3/04; F03D 1/0675; F03D 80/30; F05B 2240/30; F05B 2280/6003
See application file for complete search history.

(56) References Cited

U.S. PATENT DOCUMENTS 6,457,943 B1 * 10/2002 Olsen .................... F03D 1/0675
                                                        416/230
7,494,324 B2 * 2/2009 Hibbard ................. H02G 13/00
                                                        416/230

(Continued)

FOREIGN PATENT DOCUMENTS

CN     1317072 A   10/2001
CN   101094986 A   12/2007

(Continued)

OTHER PUBLICATIONS

European Search Report for Application No. 18183110.8, dated Jan. 31, 2019.

(Continued)

*Primary Examiner* — Matthew W Jellett
(74) *Attorney, Agent, or Firm* — Schmeiser, Olsen & Watts LLP

(57) ABSTRACT

Provided is a wind turbine blade for a wind turbine, the wind turbine blade including an electrical conductor extending in a longitudinal direction of the wind turbine blade, and a carbon fiber material being electrically conductive and having a first portion which is arranged beside the electrical conductor, a second portion which is connected to the first portion and is attached and electrically connected to the electrical conductor, and a third portion which is connected to the second portion and at least partially overlaps with the first portion. Due to such an electrical connection between the electrical conductor and the carbon fiber material arcing and, thus, delamination of carbon can be avoided when conducting current of a lightning strike.

13 Claims, 3 Drawing Sheets

(56) References Cited

U.S. PATENT DOCUMENTS

| | | | |
|---|---|---|---|
| 8,133,031 B2* | 3/2012 | Arinaga | H02G 13/40 |
| | | | 416/229 R |
| 8,191,255 B2* | 6/2012 | Kristensen | F03D 80/30 |
| | | | 29/889.71 |
| 10,844,844 B2* | 11/2020 | Lee | F03D 1/0675 |
| 2007/0074892 A1 | 4/2007 | Hibbard | |
| 2008/0073098 A1 | 3/2008 | Llorente Gonzalez et al. | |
| 2009/0196751 A1* | 8/2009 | Jacobsen | F03D 1/0675 |
| | | | 416/146 R |
| 2012/0134826 A1 | 5/2012 | Arocena De La Rua et al. | |
| 2012/0194960 A1 | 8/2012 | Kristensen et al. | |
| 2015/0292479 A1 | 10/2015 | Ohlerich et al. | |
| 2016/0327028 A1 | 11/2016 | March Nomen et al. | |
| 2019/0211806 A1 | 7/2019 | Girolamo | |

FOREIGN PATENT DOCUMENTS

| | | |
|---|---|---|
| EP | 1826402 A1 | 8/2007 |
| EP | 2930010 A1 | 10/2015 |
| EP | 2930355 A1 | 10/2015 |
| EP | 3173619 A1 | 11/2016 |
| EP | 3411560 A1 | 12/2018 |
| EP | 3511560 A1 | 7/2019 |
| WO | 2005050808 A1 | 6/2005 |

OTHER PUBLICATIONS

European Communication Pursuant to Article 94(3) EPC for EP Application No. 18183110.8, dated Feb. 19, 2020.
Non-English Chinese Office Action for Application No. 201910629334.8, dated Oct. 10, 2020.

* cited by examiner

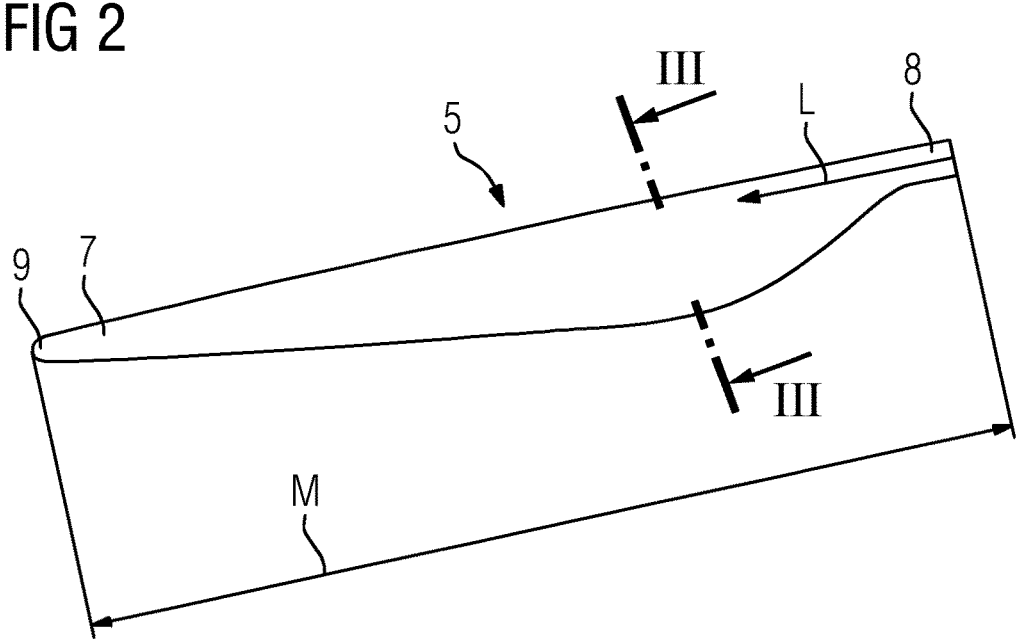
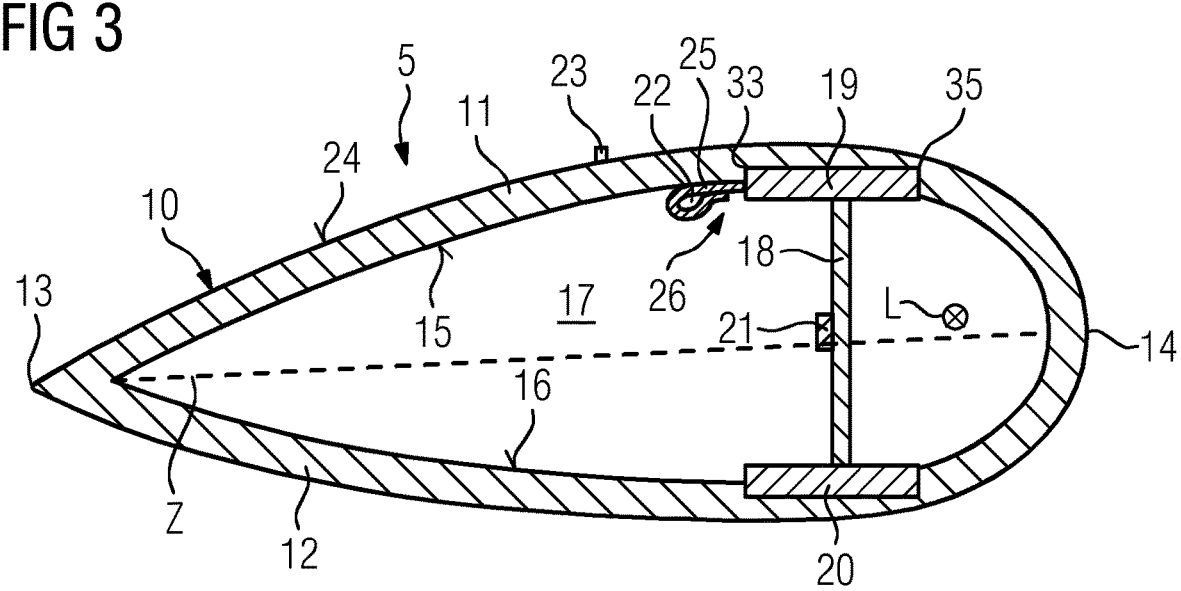

WIND TURBINE BLADE AND A WIND TURBINE

CROSS-REFERENCE TO RELATED APPLICATIONS

This application claims priority to EP Application No. 18183110.8, having a filing date of Jul. 12, 2018, the entire contents of which are hereby incorporated by reference.

FIELD OF TECHNOLOGY

The following relates to a wind turbine blade for a wind turbine and a wind turbine comprising such a wind turbine blade.

BACKGROUND

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. Further, the rotor blade is connected to the hub by means of a pitch bearing that allows a pitch movement of the rotor blade. Long rotor blades experience high wind forces.

Rotor blades may be made of two half-shells connected to each other. Further, a web, in particular a shear web, may be arranged between the two half-shells to reinforce the rotor blade. The shear web may be arranged between two beams or spar caps and may be connected thereto. The shear web, beams, and/or spar caps may extend in a longitudinal direction of the wind turbine blade and may comprise carbon.

Rotor blades are the most exposed part of the wind turbine with respect to lightning strikes. Therefore, lightning protection systems (LPS) may be provided. A lightning protection system may comprise an electrical down conductor which may be connected to the web and which may extend along a longitudinal direction of the web. The down conductor may be electrically connected to a grounding system of the wind turbine blade. Further, attachment points for the lightning—commonly known as receptors—may be arranged along a blade surface and electrically connected to the down conductor. When a lightning strike is intercepted by the receptors, the electrical current is transferred to the ground by means of the down conductor.

A further electrical conductor may be provided beside the beam, in particular extending in longitudinal direction of the wind turbine blade and electrically connected to the down conductor. To prevent damage of the beams, electrical connections between the electrical conductor and the beams may be provided. However, when conducting a lightning strike through the beam's arcs may occur. This can lead to delamination at the beams or other carbon elements.

EP 2 930 355 A1 shows a wind turbine blade having a carbon beam, an electrical conductor and copper meshes which electrically connect the electrical conductor to the carbon beam.

SUMMARY

An aspect relates to provide an improved wind turbine blade.

Accordingly, a wind turbine blade for a wind turbine is provided. The wind turbine blade comprises an electrical conductor extending in a longitudinal direction of the wind turbine blade, and a carbon fiber material being electrically conductive and having a first portion which is arranged beside the electrical conductor, a second portion which is connected to the first portion and is attached and electrically connected to the electrical conductor, and a third portion which is connected to the second portion and at least partially overlaps with the first portion.

The inventor found out that such an electrical connection between the electrical conductor and the carbon fiber material avoids arcing and, thus, delamination of the carbon when conducting a current, for example, having 86 kA. Thus, damages of the wind turbine blade may be avoided when a lightning strike is intercepted by the wind turbine blade.

In particular, all portions (first, second, third and/or fourth portion) of the carbon fiber material are formed as one-piece, i.e. integrally. Carbon fiber material means a composite material which comprises carbon fibers and a resin. The carbon fiber material includes a mat comprising unidirectional carbon fibers. For example, the carbon fiber material is provided in a trapezoidal shape before being folded. In particular, the third portion is not attached to the electrical conductor The third portion is at least partially attached to the first portion. In particular, the first portion is rhombus-shaped. The carbon fiber material has a constant material thickness which is at least five times, ten times or twenty times smaller than a width and/or length of the carbon fiber material.

According to an embodiment, the wind turbine blade further comprises a carbon element extending in the longitudinal direction of the wind turbine blade, arranged beside the electrical conductor and being electrically conductive, wherein the carbon fiber material comprises a fourth portion which is attached to the carbon element.

This has the advantage that a carbon to carbon connection is provided in order to avoid arcing and delamination of carbon. By contrast, when using a metal mesh instead of the carbon fiber material, a current would be transferred predominantly at edges of a connection between the metal mesh and the carbon element. This causes high current densities and consequent arcs such that damages at the carbon element may occur when current is transferred due to a lightning strike.

The electrical conductor and the carbon element extend in longitudinal direction of the wind turbine blade, wherein the electrical conductor and the carbon element may be arranged angled or parallel.

The fourth portion is rhombus shaped. The fourth portion is directly connected to the carbon element. For example, the fourth portion and the carbon element are casted together as part of a VARMT (Vacuum Assisted Resin Transfer Molding) process. In particular, the carbon element is a carbon fiber reinforced beam (composite material comprising carbon fibers and a resin) which is electrically conductive. In particular, the electrical connection between the carbon element and the electrical conductor is provided without copper or copper meshes, in particular without metal. The carbon element has a length which is at least 20, 30, 40, 50, 60, 70, 80 or 90% of a length of the wind turbine blade and is, for example, a support structure of the wind turbine blade which is configured to prevent kinking or buckling of the wind turbine blade. The length of the wind turbine blade may be between 15 and 90 m, 30 and 60 or 40 and 55 m.

Fiber ends of the carbon fibers of the carbon fiber material do not terminate at the first portion or the second portion and are provided at the third portion. For example, the one ends of the carbon fibers are provided at the third portion and the other ends of the carbon fibers are provided at the fourth portion. Thus, the carbon fiber material comprises carbon fibers which extend from the third portion towards the fourth portion.

According to a further embodiment, the second portion surrounds at least partially the electrical conductor.

This has the advantage that sufficient attaching surface between the carbon fiber material and the electrical conductor may be provided. Also, for this reason, arcing and damages may be avoided. The carbon fiber material is folded around the electrical conductor. In particular, the second portion surrounds the electrical conductor in a U-shape manner, in particular only in a U-shape manner.

According to a further embodiment, the third portion comprises one part which overlaps with the first portion and another part which does not overlap with the first portion.

The inventor found out that also this reduces arcing when a current is conducted. For example, not overlapping means that the other part is shifted from the first portion.

According to a further embodiment, the other part has a width which is at least 5 mm, in particular between 10 and 100 mm.

The other part is strip-shaped having a length which is at least five times, ten times or twenty times larger than the width of the other part.

According to a further embodiment, the one part is triangular shaped.

This has the advantage that, for example, sufficient attaching surface between the first portion and the third portion may be provided.

According to a further embodiment, the one part is attached to the first portion.

Thus, the connection between the electrical conductor and the carbon fiber material may be simply produced by, for example, folding the carbon fiber material one time around the electrical conductor and attaching the one part to the first portion. The one part and the first portion are casted together as part of a VARMT process.

According to a further embodiment, a distance between the carbon element and the electrical conductor is between 10 and 3000 mm or larger than 150 mm, 200 mm or 300 mm.

This has the advantage that flashovers between the electrical conductor and the carbon element may be prevented. Further, the electrical conductor is decoupled from large strains which may occur in the carbon element.

According to a further embodiment, the carbon element comprises a side edge, wherein the fourth portion comprises an end face, and wherein a distance between the side edge and the end face is between 5 and 10 mm.

This has the advantage that a large attaching surface between the fourth portion and the carbon element may be provided. The inventor found out that also this configuration reduces arcing and flashovers between the carbon element and the carbon fiber material. The fourth portion does not cover the side edge of the carbon element. Alternatively, the fourth portion covers the side edge of the carbon element and extends beyond the side edge, in particular by 5 to 10 mm.

The side edge of the carbon element is averted from the electrical conductor. In particular, the side edge is the outermost edge of the carbon element. The fourth portion overlaps with the carbon element over at least 60, 70, 80, 90, 95, or 100% of a width of the carbon element.

According to a further embodiment, a width of the carbon fiber material is between 20 and 500 mm.

This has the advantage that enough current may be transferred by the carbon fiber material and the respective electrical connections and, thus, damages of the carbon fiber material and the carbon element may be prevented when a lightning strike hits the wind turbine blade.

According to a further embodiment, the carbon element comprises a first main extension direction and the carbon fiber material comprises a second main extension direction, wherein an angle between the first main extension direction and the second main extension direction is between 0 and 90°, 30 and 60°, or 40 and 50°, in particular 45°.

In particular, the angle is an angle between the carbon fibers of the carbon fiber material and the first main extension direction. For example, the angle is an acute angle. The angle is selected based on the conductivity anisotropy of the carbon element and the carbon fiber material, in particular taking into account directions of the carbon fibers of the carbon element and of the carbon fiber material and/or the direction of glass or carbon fibers of the blade shell.

According to a further embodiment, the wind turbine blade further comprises at least or exactly two or three carbon fiber materials which are attached and electrically connected to the electrical conductor, wherein a distance between two carbon fiber materials of the at least or exactly two or three carbon fiber materials is less than 500 mm, less than 400 mm, less than 300 mm, or 200 mm.

This has the advantage that redundant electrical connections between the electrical conductor and the carbon element are provided and that the current is distributed leading to a lower current density for each carbon fiber material. Therefore, arcs and flashovers further may be prevented. The carbon fiber materials are provided identically and are connected identically to the electrical conductor and the carbon element. In particular, exactly two, three or four carbon fiber materials may be provided side by side.

According to a further embodiment, a distance between a first end of the electrical conductor and a nearest of the least or exactly two or three carbon fiber materials is between 100 and 500 mm or at least 10 mm.

This has the advantage that field concentration and arcing may be avoided. It ensures that the current is distributed such that local delaminations stay below a structural tolerance limit.

According to a further embodiment, the electrical conductor is a metal cable.

The electrical conductor is a braided cable or a metal stripe. In particular, the electrical conductor comprises aluminum, copper, steel and/or titanium. The electrical conductor has a rectangular cross-section and/or a flat cross-section.

Further, a wind turbine comprising such a wind turbine blade is provided.

Wind turbine presently refers to an apparatus converting the wind's kinetic energy into rotational energy, which may again be converted to electrical energy by the apparatus.

The wind turbine comprises three or four of such wind turbine blades.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION OF THE DRAWINGS

Some of the embodiments will be described in detail, with reference to the following figures, wherein like designations denote like members, wherein:

FIG. 2 shows a perspective view of a wind turbine blade of the wind turbine according to FIG. 1;

FIG. 3 shows schematically a cross-sectional view from FIG. 2; and

In the Figures, like reference numerals designate like or functionally equivalent elements, unless otherwise indicated.

DETAILED DESCRIPTION

Figure 1:
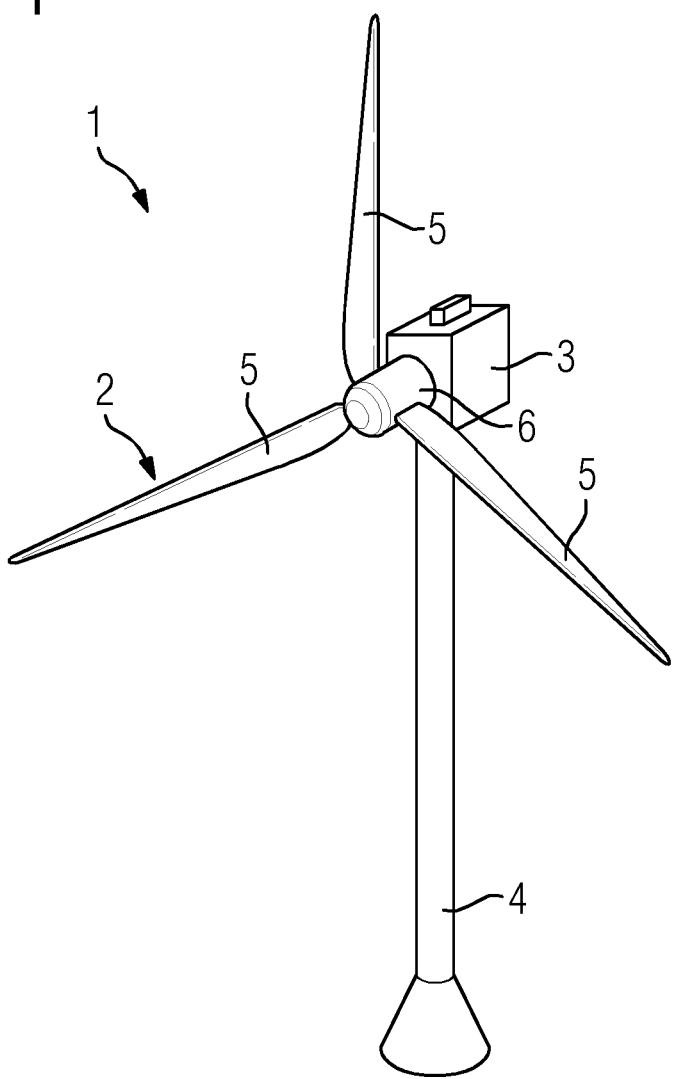
FIG. 1 shows a perspective view of a wind turbine according to one embodiment.

FIG. 1 shows a wind turbine 1. The wind turbine 1 comprises a rotor 2 connected to a generator (not shown) arranged inside a nacelle 3. The nacelle 3 is arranged at an upper end of a tower 4 of the wind turbine 1.

The rotor 2 comprises three wind turbine blades 5. The wind turbine blades 5 are connected to a hub 6 of the wind turbine 1. Rotors 2 of this kind may have diameters ranging from, for example, 30 to 200 meters or even more. The wind turbine blades 5 are subjected to high wind loads. At the same time, the wind turbine blades 5 need to be lightweight. For these reasons, wind turbine blades 5 in modern wind turbines 1 are manufactured from fiber-reinforced composite materials. Oftentimes, glass or carbon fibers in the form of unidirectional fiber mats are used.

FIG. 2 shows a wind turbine blade 5. The wind turbine blade 5 comprises an aerodynamically designed portion 7 which is shaped for optimum exploitation of the wind energy and a blade root 8 for connecting the wind turbine blade 5 to the hub 6. Further, the wind turbine blade 5 comprises a blade tip 9 which is arranged averted from the blade root 8. The wind turbine blade 5 extends in a longitudinal direction L. The blade 5 has a length M which, for example, may be between 15 to 90 m.

FIG. 3 shows schematically a cross-sectional view from FIG. 2. All elements shown in FIG. 3 are shown simplified. It is understood that intermediate elements, in particular further connecting elements and reinforcement elements, may be provided.

The wind turbine blade 5 comprises an outer blade shell 10 comprising a first half-shell 11 and a second half-shell 12 which are connected together at one side 13 of the wind turbine blade 5, in particular at a trailing edge, and at the other side 14 of the wind turbine blade 5, in particular at a leading edge, to form the outer shell 10 of the wind turbine blade 5.

A chord line Z intersects the trailing edge and the leading edge. The blade shell 10 may comprise composite fiber material. Further, the first half-shell 11 and the second half-shell 12 may be glued together. Alternatively, the blade shell 10 may be provided as a one-piece element. The first half-shell 11 comprises an inner surface 15 and the second half-shell 12 comprises an inner surface 16 being opposite to each other, wherein an inner space 17 of the wind turbine blade 5 is defined by the inner surfaces 15, 16.

A web 18, in particular a shear web, is located inside the inner space 17 extending from the inner surface 15 of the first half-shell 11 to the inner surface 16 of the second half-shell 12. The wind turbine blade 5 further comprises a carbon element 19, in particular a first carbon beam, connected to the first half-shell 11 and a carbon element 20, in particular a second carbon beam, connected to the second half-shell 12.

In particular, the carbon elements 19, 20 are electrically conductive and extend along the longitudinal direction L. The web 18 extends along the longitudinal direction L. The web 18 is located between the carbon element 19 and the carbon element 20, wherein the web 18 and the carbon elements 19, 20 are forming an I-shaped cross section. The web 18 and the carbon elements 19, 20 are forming a support structure preventing breaking or crippling of the wind turbine blade 5. Alternatively, or additionally, the carbon element 19, 20 may be provided near to the trailing edge or near to the leading edge of the wind turbine blade 5.

Further, a lightning conductor 21 is provided extending along the longitudinal direction L and being attached to the web 18. The lightning conductor 21 is arranged between the carbon elements 19, 20. The lightning conductor 21 is a down conductor. In particular, the lightning conductor 21 is a metal cable. Further, the lightning conductor 21 is grounded.

Further, an electrical conductor 22 extending in the longitudinal direction L is provided inside the inner space 17. The electrical conductor 22 is connected to the inner surface 15. In particular, a receptor 23 is arranged at an outer surface 24 of the blade 5. The receptor 23 is directly or indirectly electrically connected to the electrical conductor 22 and the lightning conductor 21 (connection is not shown).

A plurality of receptors 23 may be provided at the outer surface 24. The receptors 23 and the conductor 21 form a lightning protection system. Further, a carbon fiber material 25 being electrically conductive is provided. The carbon fiber material 25 is attached and, thus, directly electrically connected to the electrical conductor 22.

In particular, the carbon fiber material 25 is a carbon mat comprising unidirectional carbon fibers. The electrical conductor 22 is a metal cable. Furthermore, the carbon fiber material 25 is attached and, thus, directly electrically connected to the carbon element 19 which comprises carbon fibers, in particular unidirectional carbon fibers.

This has the advantage that the impedance of the carbon element 19 and the carbon fiber material 25 is in the same range and thus current is transferred homogenous, i.e. not mainly at the edges of the connection, from the carbon fiber material 25 to the carbon element 19.

The electrical conductor 22 is attached to the lighting conductor 21 (not shown) and, thus, is also directly electrically connected thereto. In particular, further electrical connections (not shown), in particular metal cables and/or standard cables or further carbon mats may be provided for electrically connecting the electrical conductor 22 to the lighting conductor 21. The electrical conductor 22, the carbon fiber material 25 and the carbon element 19 form an electrical connecting arrangement 26.

Figure 4:
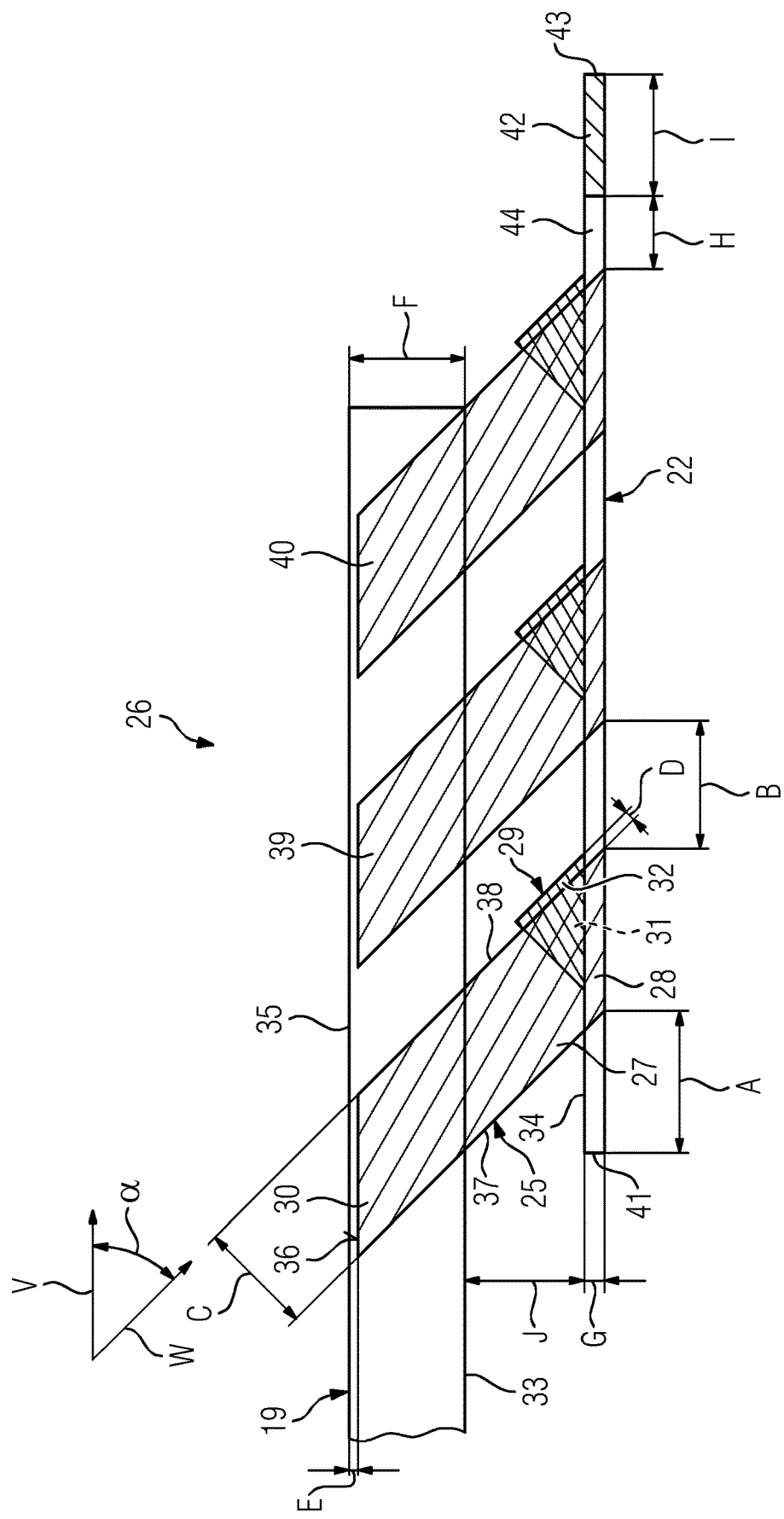
FIG. 4 shows schematically a top view of an electrical connecting arrangement of the wind turbine blade according to FIG. 2.

FIG. 4 shows schematically the electrical connecting arrangement 26 from FIG. 3, wherein a view from above is schematically shown. This means a view perpendicular to the longitudinal direction L and perpendicular to the chord line Z.

The carbon fiber material 25 comprises a portion 27 (also referred as first portion) which is arranged beside the electrical conductor 22, a portion 28 (also referred as second portion) which is connected to the portion 27 and is attached and electrically connected to the electrical conductor 22, a portion 29 (also referred as third portion) which is connected to the portion 28, and a portion 30 (also referred as fourth portion) which is attached and electrically connected to the carbon element 19. The portion 29 at least partially overlaps with the portion 27. The portions 27, 28, 29, 30 are formed by a one-piece carbon mat.

The portion 27 is arranged between the electrical conductor 22 and the carbon element 19 and is not in contact with the electrical conductor 22 and the carbon element 19. Further, the portion 27 is rhombus-shaped. The second portion 28 surrounds at least partially the electrical conductor 22 in a U-shaped manner.

The portion 29 comprises one part 31 which overlaps with the portion 27 and another part 32 which does not overlap with the portion 27, i.e. the other part 32 is arranged beside and is not in contact with the portion 27. The one part 31 is attached to the portion 27. The one part 31 is triangular shaped. The other part 32 is strip-shaped and has a width D which is at least 5 mm, in particular between 10 and 100 mm.

As shown in FIG. 4 the carbon fiber material 25 is folded one time and accommodates the electrical conductor 22 inside a fold which is formed by the portion 28. The carbon element 19 is arranged beside the electrical conductor 22. A distance J between the carbon element 19 and the electrical conductor 22 is between 10 and 3000 mm or larger than 150 mm. In particular, the distance J is measured between a side edge 33 of the carbon element 19 adjacent to the portion 27 and an edge 34 of the electrical conductor 22 adjacent to the portion 27. The edges 33 and 34 face towards each other.

Further, the carbon element 19 comprises a side edge 35 which is averted from the electrical conductor 22. The portion 30 comprises an end face 36 which is averted from the electrical conductor 22. A distance E between the side edge 35 and the end face 36 is between 5 and 10 mm or more than 5 mm. As shown in FIG. 4 the fourth portion 30 does not cover the side edge 35 of the carbon element 19. Alternatively, the fourth portion 30 covers the side edge 35 of the carbon element 19 and extends beyond the side edge 35, in particular by 5 to 10 mm.

The portion 30 completely overlaps with the carbon element 19. Thus, a sufficient attaching area between the carbon fiber material 25 and the carbon element 19 is provided. This ensures an even distribution of the current when conducting a lightning strike. Therefore, arcing between and at the carbon element 19 and the carbon fiber material 25 may be avoided when transferring the current and, thus, delamination can be prevented. The portion 30 is rhombus-shaped.

A carbon fiber material width C which is measured between two side edges 37, 38 of the carbon fiber material 25 is between 100-500 mm, in particular 200 mm. The carbon element 19 comprises a main extension direction V (also referred as first main extension direction) and the carbon fiber material 25 comprises a main extension direction W (also referred as second main extension direction), wherein an angle α between the main extension direction V and the main extension direction W is between 30 and 60° or 40 and 50°, in particular 45°. The angle α is also or alternatively provided between the edge 33 and the side edge 38. The side edges 37, 38 extend parallel to the main extension direction W.

Further, three carbon fiber materials 25, 39, 40 are provided parallel to each other. In particular, the carbon fiber materials 25, 39, 40 are provided identically and are identically attached to the electrical conductor 22. A carbon fiber material 39 is arranged beside the carbon fiber material 25, wherein a distance B between the carbon fiber materials 25, 39 is less than 500 mm, less than 400 mm, less than 300 mm, or 200 mm. A carbon fiber material 40 is arranged beside the carbon fiber material 39, wherein distance B is also provided between the carbon fiber materials 39, 40.

A distance A between a first end 41 of the electrical conductor 22 and the carbon fiber material 25 which is nearest to the first end 41 is at least 10 mm, between 100 and 500 mm. Further, the electrical conductor 22 comprises an end portion 42 comprising a second end 43 of the electrical conductor 22. The end portion 42 has length I between 200 and 300 mm or longer.

The end portion 42 may be provided as a more flexible portion compared to a remaining portion 44 of the electrical conductor 22. The end portion 42 is a flexible component. In particular, this means that the end portion 42 is kept dry during the casting of the precasted carbon element 19, in particular the spar cap, in order to facilitate the electrical connection with the lighting conductor 21 (see FIG. 3) during blade assembly. A distance H between the carbon fiber material 40 which is nearest to the end portion 42 is between 100 and 500 mm.

A distance F between the side edge 33 and the side edge 35 is between 100 and 1000 mm, 300 and 800 mm, or 500 and 700 mm, in particular exactly 600 mm which is a width of the carbon element 19.

Further, the electrical conductor 22 comprises a width G which is between 10 and 200 mm, 20 and 70 mm or 20 and 40 mm, in particular exactly 30 mm. The electrical conductor 22 is a cable having a flat shape, i.e. having a flat cross-section, to have a good pressure distribution during manufacturing at interfaces with the carbon fiber materials 25, 39, 40. The electrical conductor 22 has a rectangular cross-section (not shown).

In particular, the carbon element 19 and the electrical conductor 22 are electrically connected by means of exactly two, three or four carbon fiber materials 30, 39, 40 (only three are shown in FIG. 4). The electrical conductor 22 is a metal conductor, e.g. a braided cable or a metal stripe, made of aluminum, copper, steel and/or titanium that contacts the carbon fiber material 25, 39, 40 over a large surface.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade for a wind turbine, the wind turbine blade comprising an electrical conductor extending in a longitudinal direction of the wind turbine blade, and a carbon fiber material being electrically conductive and having a first portion which is arranged beside the electrical conductor, a second portion which is connected to the first portion and is attached and electrically connected to the electrical conductor, and a third portion which is connected to the second portion and at least partially overlaps with the first portion, wherein the third portion comprises one part which overlaps with the first portion and another part which does not overlap with the first portion, wherein the one part is triangular shaped.

2. The wind turbine blade according to claim 1, further comprising a carbon element extending in the longitudinal direction of the wind turbine blade, arranged beside the electrical conductor and being electrically conductive, wherein the carbon fiber material comprises a fourth portion which is attached to the carbon element.

3. The wind turbine blade according to claim 1, wherein the second portion surrounds at least partially the electrical conductor.

4. The wind turbine blade according to claim 1, wherein the other part has a width which is at least 5 mm.

5. The wind turbine blade according to claim 1,
wherein the one part is attached to the first portion.

6. The wind turbine blade according to claim 2,
wherein a distance between the carbon element and the electrical conductor is between 10 and 3000 mm.

7. The wind turbine blade according to claim 2,
wherein the carbon element comprises a side edge, wherein the fourth portion comprises an end face,
and wherein a distance between the side edge and the end face is between 5 and 10 mm.

8. The wind turbine blade according to claim 1,
wherein a width of the carbon fiber material is between 20 and 500 mm.

9. The wind turbine blade according to claim 2,
wherein the carbon element comprises a first main extension direction and the carbon fiber material comprises a second main extension direction, and wherein an angle between the first main extension direction and the second main extension direction is between one of 0 and 90°.

10. The wind turbine blade according to claim 1, further comprising at least or exactly two or three carbon fiber materials which are attached and electrically connected to the electrical conductor, wherein a distance between two carbon fiber materials of the at least or exactly two or three carbon fiber materials is less than 500 mm.

11. The wind turbine blade according to claim 10, wherein a distance between a first end of the electrical conductor and a nearest of the least or exactly two or three carbon fiber materials is between 100 and 500 mm.

12. The wind turbine blade according to claim 1,
wherein the electrical conductor is a metal cable.

13. A wind turbine comprising:
a wind turbine blade having an electrical conductor extending in a longitudinal direction of the wind turbine blade, and a carbon fiber material being electrically conductive and having a first portion which is arranged beside the electrical conductor, a second portion which is connected to the first portion and is attached and electrically connected to the electrical conductor, and a third portion which is connected to the second portion and at least partially overlaps with the first portion,
wherein the third portion comprises one part which overlaps with the first portion and another part which does not overlap with the first portion,
wherein the one part is triangular shaped.

* * * * *